Feb. 19, 1963 H. W. BOOK 3,077,777
THERMAL INDICATOR FOR ELECTRICAL APPARATUS
Filed Feb. 13, 1959

INVENTOR
Herbert W. Book
BY
F. E. Browder
ATTORNEY

United States Patent Office 3,077,777
Patented Feb. 19, 1963

3,077,777
THERMAL INDICATOR FOR ELECTRICAL APPARATUS
Herbert W. Book, Hickory Township, Mercer County, Pa., assignor to Westinghouse Electric Corporation, East Pittsburgh, Pa., a corporation of Pennsylvania
Filed Feb. 13, 1959, Ser. No. 793,027
15 Claims. (Cl. 73—350)

This invention relates to thermal indicators for electrical apparatus.

In certain types of conventional electrical apparatus, such as transformers, it has been the common practice in building such apparatus to bury thermostats, thermocouples and other thermally responsive devices in the windings of such apparatus, the temperature or thermal load condition of which it is desired to measure or indicate. If such thermal indicating equipment should require repair, it may be necessary to tear down the windings or other parts of such apparatus. The latter procedure may also be necessary to add thermal indicating equipment to existing apparatus.

In my copending application Serial No. 649,116, which is assigned to the same assignee as the present application, I disclosed principles of an improved thermal or temperature indicator which does not require thermally responsive parts or devices to be built into the windings of an associated electrical apparatus. The latter thermal indicator is particularly adapted for mounting or installation inside the casing or housing of an associated electrical apparatus, such as a transformer. In certain applications, however, such as those where thermal indicating equipment is to be added to existing electrical apparatus of the enclosed type, it is desirable to provide an improved thermal indicator which is particularly adapted for installation external to or on the outside of the casing or housing of such apparatus.

It is an object of this invention to provide a new and improved thermal indicator for electrical apparatus.

Another object of this invention is to provide a new and improved temperature indicator for electrical apparatus.

A further object of this invention is to provide for measuring and indicating the temperature or thermal load condition of an electrical winding which is so disposed in a casing or relative to other apparatus that it is not readily accessible.

A still further object of the invention is to provide thermal indicating means for electrical apparatus which responds to a magnetic field resulting from the flow of electrical current which causes the heating of said apparatus.

A more specific object of the invention is to provide a thermal indicator for an enclosed electrical apparatus which is particularly adapted for installation external to or on the outside of the casing of such apparatus.

Other objects of the invention will, in part, be obvious and will, in part, appear hereinafter.

For a fuller understanding of the nature and objects of the invention, reference should be had to the following detailed description taken in connection with the accompanying drawing, in which.

Figure 1:
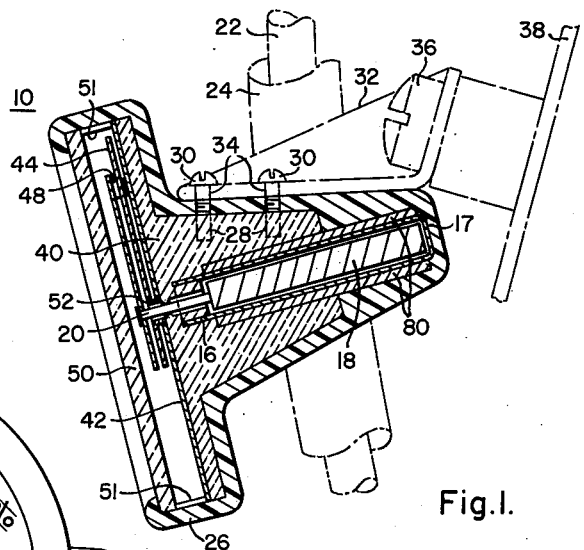
FIG. 1 is a sectional view taken along the line I—I in FIG. 3, illustrating a thermal indicator embodying the teachings of the invention.
Figure 3:
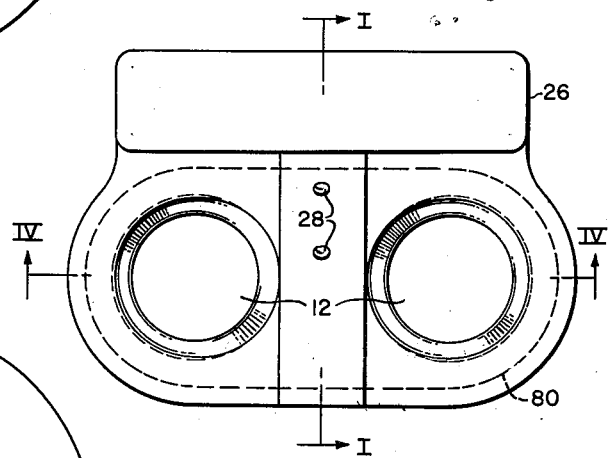
FIG. 3 is a top plan view of the indicator shown in FIG. 1.
Figure 4:
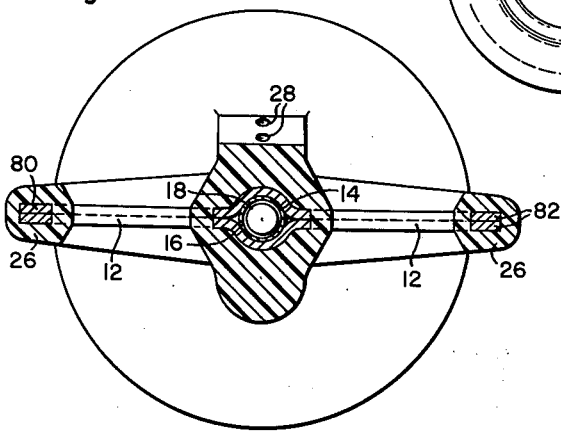
FIG. 4 is a sectional view taken along the line IV—IV in FIG. 3 of the indicator shown in FIG. 1.

Referring now to the drawings and FIGS. 1, 3 and 4 in particular, there is illustrated in general a temperature or thermal load indicator 10 embodying the teachings of the invention. The indicator for electrical apparatus shown generally at 10 is a modification suitable for application to a distribution transformer. The casing or housing of the associated electrical apparatus such as a transformer is indicated at 38 in FIG. 1. The electrical apparatus enclosed or disposed inside the casing 38 may be a transformer core and coil assembly (not shown) to and from which electrical current is carried from outside of the casing 38 by associated leads, which may include one or more conductors such as the conductor 22 having a covering of insulation 24 thereon, as shown in FIG. 1. The flow of electrical current to the associated electrical apparatus through the conductor leads 22 causes the temperature or thermal load condition of the electrical windings or coils of such apparatus inside the casing 38 to change, the extent of such changes being measured and indicated by the thermal indicator 10. Since the thermal indicator 10 is disposed adjacent to the leads of the associated electrical apparatus it is preferable that, if the indicator is employed with a transformer core and coil assembly, the indicator 10 be disposed adjacent to the secondary or low voltage leads associated with said assembly in order to reduce the insulation requirements in the construction of said indicator.

The thermal indicator 10 is mounted or secured on the outside of the casing 38 of the associated electrical apparatus by any suitable means, such as the stud member 36 which is welded or otherwise secured to the casing 38 and a bracket member 32 which, in turn, is secured to said stud member and to the thermal indicator 10 by the screws 30. In the modification of the invention illustrated in FIG. 1, the indicator 10 comprises a case 26 which may be molded or cast from some suitable material, such as a silicone rubber or elastomer, that will have adequate strength and capacity to resist weather when mounted outdoors. Since the indicator 10 may be associated with a transformer which is mounted on poles or in some location well above the ground level, the case 26 and the bracket member 32 may be arranged so that the face or dial 42 of the indicator 10 will be inclined at an angle to the horizontal to facilitate reading from the ground.

The thermal indicator 10 also comprises a magnetic member 80 which is mounted or disposed inside the case or housing 26 as shown in FIGS. 1, 3 and 4. Both the case 26 and the magnetic member 80 include two openings or apertures 12 which permit one or more leads such as the conductor leads 22 shown in FIG. 1 to pass through said case and said magnetic member. As best shown in FIG. 4, the magnetic member 80 may be conveniently formed from two plates or sheets 82, each of said plates including a curved portion between the apertures 12 to form a cavity or receptacle 14. The magnetic member 80 is preferably formed from a metallic magnetic material and may be molded from powdered metals, cast in one piece from metallic material or formed in other suitable ways that are well-known in the art and that will provide the features to be described hereinafter. The size, shape and thickness of the magnetic member 80 will depend to a large extent on the apparatus with which it is to be utilized. The selection of the magnetic material from which the magnetic member 80 is formed may also depend on the insulation to be used and may be formed from any of the well-known magnetic metals, alloys or metallic oxides which are available.

As explained in greater detail in my copending application previously mentioned, whenever electrical current flows through the conductor leads 22 to an associated electrical apparatus inside the casing 38, a magnetic field will be set up adjacent to or around the conductor leads 22. The density of the magnetic field set up around the conductor leads 22 will vary with the amount of current flowing in said leads. When a metallic magnetic member such as the member 80 is disposed in the magnetic field around the conductor leads 22, many of the lines of magnetic flux in the space around said member will be concentrated in it to thereby heat up said member. The member 80 thus accumulates or stores heat which varies with the density of the magnetic flux around the conductor leads 22, which in turn varies with the electrical current flowing in the conductor leads 22 and the associated electrical apparatus inside the casing 38. Since the temperature or thermal load condition of the electrical apparatus, which may include electrical windings or coils inside the casing 38, varies also with the current flowing in the conductor leads 22, the temperature or thermal condition of the magnetic member 80 will vary as a function of the temperature or thermal condition of the apparatus inside the casing 38. In other words, the magnetic member 80 may be suitably designed to provide a "thermal image" of the electrical apparatus which is disposed inside the casing 38.

In order to control the heat transfer from the magnetic member 80, the case 26 is preferably formed from a thermally insulating material, which may also be an electrically insulating material to assist in insulating the magnetic member 80 from the conductor leads 22. The thermal insulation 40 may also be disposed around a portion of the magnetic member 80 to assist in the control of heat transfer from said member. The thermal insulation 40 may be provided in the form of a cast base member which assists in supporting indicating means associated with the magnetic member 80. It is to be understood that in certain applications a portion of the case 26 may be formed from thermally conducting material to provide a heat sink in order to more closely create a thermal image having similar thermal characteristics to the electrical apparatus inside the casing 38. In other words, by proper selection and design of the case 26 and the thermal insulation 40 as well as the magnetic member 80, the temperature or thermal condition of the magnetic member 80 may more closely correspond to the thermal operating characteristics of the associated electrical apparatus. It is to be noted that the case 26 is secured to the bracket member 32 by any suitable means, such as the self-tapping screws 34 which pass through the holes 34 in said bracket member and engage the case 26 and the thermal insulation 40 as indicated at 28 in FIG. 1.

In order to sense the temperature or thermal condition of the magnetic member 80, which is a function of the temperature of the associated electrical apparatus as previously mentioned, a thermally responsive device or means, more specifically a helical bimetallic element 18, which may be of any conventional type, is disposed in the receptacle 14. In order to improve the response of the bimetallic element 18 to the temperature or thermal condition of the magnetic member 80, the axes of the receptacle 14 and the bimetal 18 preferably lie in substantially the same plane as the magnetic member 80 and said bimetal is substantially surrounded by said magnetic member. In order to provide a smooth surface for the receptacle 14 in which the bimetallic element 18 may rotate as it changes shape or deforms in response to the temperature of the magnetic member 80, a liner or tube member 16 is disposed inside the receptacle 14 having one end closed as indicated at 17 in FIG. 1. The tube member 16 is preferably formed from a material having a high degree of thermal conductivity and preferably being of a non-corrosive nature, such as copper or brass. The closed end 17 of the tube member 16 also permits the molding of the case 26 around at least one side of the magnetic member 80 since it prevents the entrance of the molding material into the receptacle 14.

Figure 2:
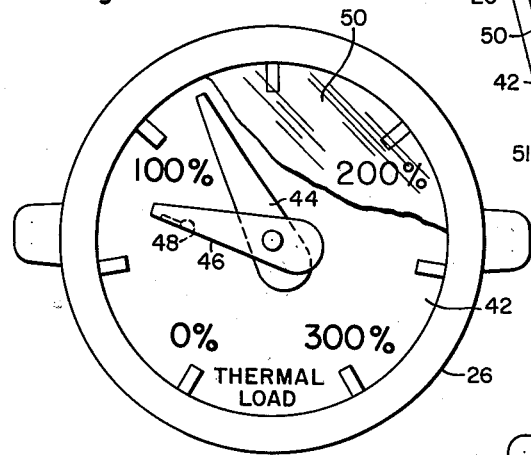
FIG. 2 is a front view of the indicator shown in FIG. 1.

In order to indicate the temperature or thermal condition of the magnetic member 80, a rotatable shaft 20 is secured or attached to the helical bimetallic element 18 by suitable means, such as soldering or brazing. As the electrical current which flows in the lead conductors 22 changes, the magnetic flux around said leads changes and the temperature of the magnetic member 80 changes. The helical bimetallic element 18 responds to or is actuated by changes in the temperature of the magnetic member 80 to cause the rotatable shaft 20 to turn in one direction or the other depending on the change in the temperature of the magnetic member 80. In order to provide a visual indication of the temperature of the magnetic member 80, an indicating hand pointer 46 is attached to the rotatable shaft 20 and disposed in front of a dial member 42 as shown in FIG. 2. As mentioned previously, the dial member 42 is disposed inside the case 26 and may be supported by the thermal insulation 40 or by any other suitable means. A dial window 50 made from a suitable material, such as glass or transparent plastic material, may be disposed in front of the dial member 42 and the indicating hand pointer 46 in the widened or flanged portion of the case 26 at the front of the indicator 10. The dial window support member 51 may be provided to support the dial window 50 between the dial member 42 and the overlapping edge of the case 26, as shown in FIG. 1.

Since the temperature of the magnetic member 80 varies with the temperature or thermal load condition of the associated apparatus inside the casing 38, the dial member 42 may be calibrated in terms of the thermal load of the associated apparatus inside the casing 38, which may include electrical windings or coils. In particular, the dial member 42 may be calibrated to indicate the percentage of the rated thermal load of the associated electrical apparatus. The deflection or position of the indicating hand pointer 46 provides a visual indication of the thermal load condition or temperature of the associated electrical apparatus. In order to indicate the maximum thermal load of the associated electrical apparatus between successive readings, a maximum indicating or follower hand pointer 44 is rotatably disposed about the axis of the rotatable shaft 20 in any suitable manner. As illustrated, a sleeve or bushing member 52 may be attached to the dial member 42 where the shaft 20 passes through said dial member and the maximum indicating hand pointer 44 rotatably mounted on the bushing member 52. Since the maximum indicating hand pointer 44 is disposed between the indicating hand pointer 46 and the dial member 42, the hand pointer 46 may be provided with a projection or cam member 48 which is arranged to drive or rotate the maximum indicating hand pointer 44 to the highest or maximum point of travel or deflection of the hand pointer 46 during the operation of the indicator 10. Suitable means may also be provided for retaining the maximum indicating hand pointer 44 in the highest point to which it is driven by the hand pointer 46, such as a friction fit on the bushing member 52. Since the indicating hand pointer 46 is arranged to drive the maximum indicating hand pointer 44 only in the upward or clockwise direction, the maximum indicating hand pointer 44 remains at the maximum point of travel or deflection of the indicating hand pointer 46 whenever the bimetallic element 18 cools and causes the indicating hand pointer 46 to rotate in a counterclockwise direction to a lower thermal load reading.

Considering the overall operation of the thermal load or temperature indicator 10, the temperature or thermal load condition of the electrical apparatus inside the casing 38 changes whenever the electrical current flowing through the conductor leads 22 changes. A change in the electrical current through the conductor leads 22 also causes a corresponding change in the temperature of the magnetic member 80 which is a function of and varies with the temperature of the associated electrical apparatus inside the casing 38. A change in the temperature or thermal condition of the magnetic member 80 causes the helical bimetal 18 to be actuated in response to said changes in temperature which, in turn, causes a turning movement of the rotatable shaft 20. The rotation of the shaft 20 causes a change in the deflection of the indicating hand pointer 46 which causes a change in the thermal load reading on the calibrated dial member 42 of the indicator 10. The maximum travel or deflection of the indicating hand pointer 46 between successive readings is indicated visually by the position of the maximum indicating hand pointer 44, as previously discussed. It is to be understood that the dial member 42 may also be calibrated in terms of various other conditions associated with an electrical apparatus which vary with the electrical current flowing to and from said apparatus.

Other visual indicating means, such as a round calibrated dial mounted on the shaft 20, which is rotatable with respect to a stationary zero mark, may be employed in a particular application.

In a preferred embodiment of the invention it has been found desirable to substantially surround the magnetic member 80 with thermally insulating material, such as the thermal insulation 40 and the case 26 which is preferably made from thermally insulating material. As previously mentioned, it may be desirable in certain applications to provide thermally conductive material adjacent to a portion of the magnetic member 80 to act as a heat sink in order to have the magnetic member 80 more closely simulate the thermal operating characteristics or qualities of an associated electrical apparatus. It is also desirable that the magnetic member 80 and the thermal insulating material employed to control the heat transfer from said member be selected and arranged so that the thermal time constant of said member more closely approach the thermal time constant of the associated electrical apparatus.

It is to be understood that the magnetic member 80 may be provided in different sizes and shapes in different applications, but it is essential that the magnetic member 80 be disposed in the magnetic field of the leads in which electrical current flows to and from an associated electrical apparatus whose thermal condition depends on the amount of electrical current flowing in said apparatus. It is also to be understood that the thermal insulation 40 and the case 26 may be cast or molded as an integral piece around the magnetic member 80 and the associated indicating means.

The apparatus embodying the teachings of this invention has several advantages. For example, the thermal load indicator or temperature indicator as disclosed may be readily mounted or installed on existing electrical apparatus of the enclosed type without the necessity for opening the casing of said apparatus. In addition, the thermal image of an electrical apparatus made available outside the casing of said apparatus is effectively employed in a thermal indicator which may accurately indicate the thermal load condition of the associated electrical apparatus.

Since numerous changes may be made in the above described apparatus, and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A thermal load indicator for electrical apparatus having an electrical winding disposed in a casing and subject to heating when conducting electrical current and leads which pass into said casing and are connected to said winding for conducting current, the current through said leads setting up a magnetic field around said leads, the combination comprising a magnetic member disposed externally of said casing in the magnetic field around the leads which causes said member to concentrate said magnetic field and to accumulate heat when current flows in said leads, said magnetic member comprising first and second plates each having first and second holes through which said leads pass and a curved portion between said holes, said plates being assembled in substantial registry to form a central passageway therebetween, the temperature of said member varying as a function of the temperature of said winding, thermally responsive means disposed in the passageway of said member for deforming in response to the temperature of said member, and indicating means associated with said thermally responsive means for indicating the thermal load of said apparatus as said thermally responsive means deforms.

2. A thermal load indicator for electrical apparatus having an electrical winding disposed in a casing and subject to heating when conducting electrical current and leads connected to said winding for conducting current, the current through said leads setting up a magnetic field around said leads, comprising a magnetic member disposed outside said casing in said magnetic field which causes said member to accumulate heat when current flows in said leads, said magnetic member comprising first and second plates each having first and second holes through which said leads pass and a deformed portion between said holes, said plates being assembled in substantial registry to form a central passageway therebetween, the temperature of said member varying as a function of the temperature of said winding, a bimetallic element disposed adjacent to said member for deforming in response to the temperature of said member, and indicating means associated with said bimetal means for indicating the thermal load of said apparatus as said bimetallic element deforms.

3. A thermal load indicator for a transformer having an electrical winding which is disposed in a casing and which is subject to heating when current flows therethrough and leads connected to said winding for conducting current, the flow of current creating a magnetic field around said leads, comprising a heat receiving passage formed by two flat magnetic plates having aligned recessed portions assembled to provide a tubular opening and disposed externally of said casing in said magnetic field of said leads to heat up when current flows in at least one of said leads, the temperature of said plates varying with the temperature of said winding, a bimetallic element disposed in said passage to be actuated in response to the temperature of said member, a rotatable shaft connected to said bimetallic element, and means associated with said shaft for indicating the temperature of said member.

4. A thermal load indicator for a transformer having an electrical winding which is disposed in a casing and which is subject to heating when current flows therethrough, leads connected to said winding for conducting current, the flow of current creating a magnetic field around said leads, comprising a metallic magnetic member disposed outside said casing in said magnetic field of said leads to heat up when current flows in at least one of said leads, said magnetic member comprising first and second flat plates each having a plurality of apertures through which the respective leads pass and a deformed portion between at least two of said plurality of apertures, said plates being assembled with the corresponding apertures in said plates in substantial registry to define a tubular receptacle, the temperature of said member varying with the temperature of said winding, a bimetallic element disposed in the receptacle of said member to be actuated in response to the temperature of said member, the axes of said receptacle and said bimetallic element lying in substantially the same plane as said plates, a rotatable shaft connected to said bimetallic element, and means associated with said shaft for indicating the temperature of said member, said means being calibrated to indicate the thermal load of said transformer.

5. A thermal load indicator for an electrical apparatus having an electrical winding subject to heating when current flows therethrough and leads connected to said winding for conducting current, the flow of current creating a magnetic field around said leads, comprising a metallic magnetic member disposed in said magnetic field of said leads to concentrate said magnetic field and to heat up when current flows in at least one of said leads, said magnetic member comprising two plates shaped and assembled to form a receptacle therebetween, the temperature of said member varying with the temperature of said winding, a helical bimetallic element disposed in the receptacle of said member to be actuated in response to the temperature of said member, a rotatable shaft connected to said bimetallic element, and means associated with said shaft for indicating the temperature of said member, said means comprising a dial disposed about said shaft, and a rotatable indicating hand attached to said shaft in front of said dial.

6. A thermal load indicator for a transformer having an electrical winding subject to heating when current flows therethrough and leads connected to said winding for conducting current, the flow of current creating a magnetic field around said leads, comprising a metallic magnetic member disposed in said magnetic field of said leads to concentrate said magnetic field to heat up when current flows in at least one of said leads, said magnetic member comprising two plates shaped and assembled to form a receptacle therebetween, the temperature of said member varying with the temperature of said winding, a helical bimetallic element disposed in the receptacle of said member to be actuated in response to the temperature of said member, a rotatable shaft connected to said bimetallic element, and means associated with said shaft for indicating the temperature of said member, said means being calibrated to indicate the thermal load of said transformer, said means comprising a dial disposed about said shaft, and a rotatable indicating hand attached to said shaft in front of said dial.

7. A thermal load indicator for an electrical apparatus having an electrical winding subject to heating when current flows therethrough and leads connected to said winding for conducting current, the flow of current creating a magnetic field around said leads, comprising a metallic magnetic member disposed in said magnetic field of said leads to heat up when current flows in at least one of said leads, said magnetic member including one or more holes through which one or more of said leads passes, the temperature of said member varying with the temperature of said winding, said magnetic member comprising two plates each having one or more holes shaped and assembled in substantial registry to form a receptacle therebetween, a helical bimetallic element disposed in the receptacle, said member to be actuated in response to the temperature of said member, the axes of said receptacle and said bimetallic element lying in substantially the same plane as said plates, a rotatable shaft connected to said bimetallic element, and means associated with said shaft for indicating the temperature of said member, said means comprising a dial disposed adjacent to said shaft, a rotatable indicating hand connected to said shaft in front of said dial, and indicating means rotatable about said shaft for indicating the maximum position of said indicating hand.

8. A thermal load indicator for a transformer having an electrical winding subject to heating when current flows therethrough and leads connected to said winding for conducting current, the flow of current creating a magnetic field around said leads, comprising a metallic magnetic member disposed in said magnetic field of said leads to heat up when current flows in at least one of said leads, said magnetic member including one or more holes through which one or more of said leads passes, the temperature of said member varying with the temperature of said winding, said magnetic member comprising two plates shaped and assembled to form a receptacle therebetween, a helical bimetallic element disposed in the receptacle of said member to be actuated in response to the temperature of said member, a rotatable shaft connected to said bimetallic element, a casing of thermally insulating material for enclosing said member and said bimetal to control the heat transfer from said member, and means associated with said shaft for indicating the temperature of said member.

9. A thermal load indicator for a transformer having an electrical winding subject to heating when current flows therethrough and leads connected to said winding for conducting current, the flow of current creating a magnetic field around said leads, comprising a metallic magnetic member disposed in said magnetic field of said leads to heat up when current flows in at least one of said leads, said magnetic member comprising two plates shaped and assembled to form a receptacle therebetween, the temperature of said member varying with the temperatures of said winding, a helical bimetallic element disposed in the receptacle of said member to be actuated in response to the temperature of said member, a rotatable shaft connected to said bimetallic element, thermally insulating material disposed about said magnetic member to control heat transfer from said member, and means associated with said shaft for indicating the temperature of said member.

10. A temperature indicator for electrical apparatus provided with an electrical coil disposed to be energized through leads, comprising, a metallic magnetic member having a predetermined capacity for conducting lines of magnetic flux disposed adjacent to said leads, said magnetic member having one or more holes through which one or more of said leads passes, the flow of current in said leads establishing a magnetic field which causes said member to heat up, said magnetic member comprising two plates each having one or more holes therein shaped and assembled in substantial registry to form a receptacle therebetween, the temperature of said member varying with the temperature of said coil, a helical bimetallic element disposed in the receptacle of said member to be responsive to the temperature of said member, means for supporting said member and said bimetallic element in a predetermined relation with respect to said leads, a rotatable shaft connected to said bimetal and means associated with said shaft for indicating the temperature of said member.

11. A temperature indicator for electrical apparatus provided with an electrical coil disposed to be energized through leads comprising, a metallic magnetic member having a predetermined capacity for conducting lines of magnetic flux disposed adjacent to said leads, said magnetic member having one or more holes through which one or more of said leads passes, the flow of current in said leads establishing a magnetic field which causes said member to heat up, said magnetic member comprising two plates each having one or more holes therein shaped and assembled in substantial registry to form a receptacle therebetween, the temperature of said member varying with the temperature of said coil, a helical bimetallic element disposed in the receptacle of said member to be responsive to the temperature of said member, means for supporting said member and said bimetallic element in a predetermined relation with respect to said leads, a rotatable shaft connected to said bimetal and means associated with said shaft for indicating the temperature of said member, said indicating means being calibrated to indicate the temperature of said apparatus.

12. A transformer comprising a casing; an electrical winding disposed in said casing; leads passing through said casing from the outside thereof through which electrical current is conducted to and from said winding; said electrical current causing the temperature of said winding to vary, the flow of electrical current in said leads establishing a magnetic field about said leads; means for indicating the temperature of said winding; said means comprising a magnetic member disposed outside said casing in the field surrounding at least one of said leads and heated by said field to a temperature which varies with the temperature of said winding, said magnetic member comprising first and second plates each having a central recessed portion, said plates being assembled with the recessed portions substantially aligned to form a tubular opening therebetween, a helical bimetallic element disposed in thermal relationship with said magnetic member in said tubular opening, a rotatable shaft connected to said helical bimetallic element and indicating means connected to said shaft.

13. A transformer comprising a casing; an electrical winding disposed in said casing; leads passing through said casing from the outside thereof through which electrical current is conducted to and from said winding; said electrical current causing the temperature of said winding to vary the flow of electrical current in said leads establishing a magnetic field about said leads; means for indicating the temperature of said winding; said means comprising a magnetic member disposed outside said casing in the field surrounding at least one of said leads and heated by said field to temperature which varies with the temperature of said winding, said magnetic member comprising first and second plates each having first and second spaced openings and a central deformed portion between said openings, said plates being assembled flatwise with the corresponding openings in substantial registry and the deformed portions substantially aligned to form a passageway therebetween, a helical bimetallic element disposed in thermal relationship with said magnetic member in said passageway, said helical bimetallic element being connected to a rotatable shaft, and calibrated indicating means connected to said shaft.

14. A transformer comprising an electrical winding; a casing in which said winding is disposed; leads passing through said casing from the outside thereof through which electrical current is conducted to and from said winding; said electrical current causing the temperature of said winding to vary and the flow of electrical current in said leads establishing a magnetic field about said leads; means for indicating the temperature of said winding; said means comprising a magnetic member disposed outside said casing in the magnetic field surrounding at least one of said leads and heated by said magnetic field to a temperature which varies with the temperature of said winding, said magnetic member comprising two plates shaped and assembled to form a receptacle therebetween, a helical bimetallic element disposed in thermal relationship with said magnetic member, the axes of said receptacle and said metallic element lying in substantially the same plane as said plates, a rotatable shaft connected to said helical bimetallic element and indicating means connected to said shaft, said indicating means comprising a proportional indicating hand mounted on said rotatable shaft and a calibrated dial disposed in readable relationship therewith.

15. A transformer comprising a casing; an electrical winding disposed in said casing; leads passing through said casing from the outside thereof through which electrical current is conducted to and from said winding; said electrical current causing the temperature of said winding to vary and the flow of electrical current in said leads establishing a magnetic field about said leads; means for indicating the temperature of said winding; said means comprising a magnetic member disposed externally of said casing in the magnetic field surrounding at least one of said leads and heated by said magnetic field to a temperature which varies with the temperature of said winding, said magnetic member comprising first and second plates each having first and second holes through which said leads pass and a curved portion between said holes, said plates being assembled in substantial registry to form a central passageway therebetween, a helical bimetallic element disposed in thermal relationship with said magnetic member in said passageway, a rotatable shaft connected to said helical bimetallic element and indicating means associated with said shaft, said indicating means comprising a proportional indicating hand mounted on said rotatable shaft, a calibrated dial disposed in readable relationship with said hand a maximum indicating hand, means attached to said calibrated dial for rotatably mounting said maximum indicating hand, said proportional indicating hand having a driving member disposed to contact and rotate said maximum indicating hand.

References Cited in the file of this patent
UNITED STATES PATENTS

| | | |
|---|---|---|
| 1,917,163 | Stephen et al. | July 4, 1933 |
| 1,953,914 | Camili | Apr. 3, 1934 |
| 2,457,286 | Tollefsen | Dec. 28, 1948 |

FOREIGN PATENTS

| | | |
|---|---|---|
| 487,735 | Great Britain | June 24, 1938 |